United States Patent [19]

Takeuchi

[11] 4,202,549

[45] May 13, 1980

[54] DEVICE FOR MANUALLY CONTROLLING MOVEMENT OF PICKUP ARM IN AUTOMATIC RECORD PLAYER

[75] Inventor: Atsushi Takeuchi, Hamamatsu, Japan

[73] Assignee: Nippon Gakki Seizo Kabushiki Kaisha, Hamamatsu, Japan

[21] Appl. No.: 943,644

[22] Filed: Sep. 18, 1978

[30] Foreign Application Priority Data

Sep. 22, 1977 [JP] Japan ............................ 52-114387
Sep. 22, 1977 [JP] Japan ........................ 52-128155[U]

[51] Int. Cl.² .............................................. G11B 3/00
[52] U.S. Cl. .................................. 274/9 RA; 318/640
[58] Field of Search .............. 274/9 RA, 13 R, 14 R, 274/15 R; 318/640; 179/100.4 D

[56] References Cited

U.S. PATENT DOCUMENTS

| 2,952,464 | 9/1960 | Stimler | 274/15 R |
| 3,662,363 | 5/1972 | Chertok | 274/9 RA X |
| 3,672,687 | 6/1972 | Ben Daniel et al. | 274/15 R X |
| 3,937,903 | 2/1976 | Osann | 274/15 R X |

Primary Examiner—Charles E. Phillips

Attorney, Agent, or Firm—Cushman, Darby & Cushman

[57] ABSTRACT

A device for manually controlling movement of a pickup arm in an automatic record player, comprising: a manually movable manipulation member; a detecting unit including at least one light-emitting element and at least two light-receiving elements disposed to receive the beam of light emitted from the light-emitting element to detect the amount and direction of a movement of the manipulation member and to generate a corresponding signal; control circuitry receiving this signal to generate an output corresponding to the direction and the amount of the movement of the manipulation member; and a driving unit for causing linear parallel movement of the pickup arm radially of a record disk and actuated by the output of the control circuitry to move this pickup arm in a direction and amount of movement corresponding to those of the manipulation member. This device assures easy and free control of the movement of the pickup arm in a desired direction and amount by manipulation of a single manipulation member, and improves the life of the detecting unit due to non-mechanical contact mechanism of this unit.

12 Claims, 34 Drawing Figures

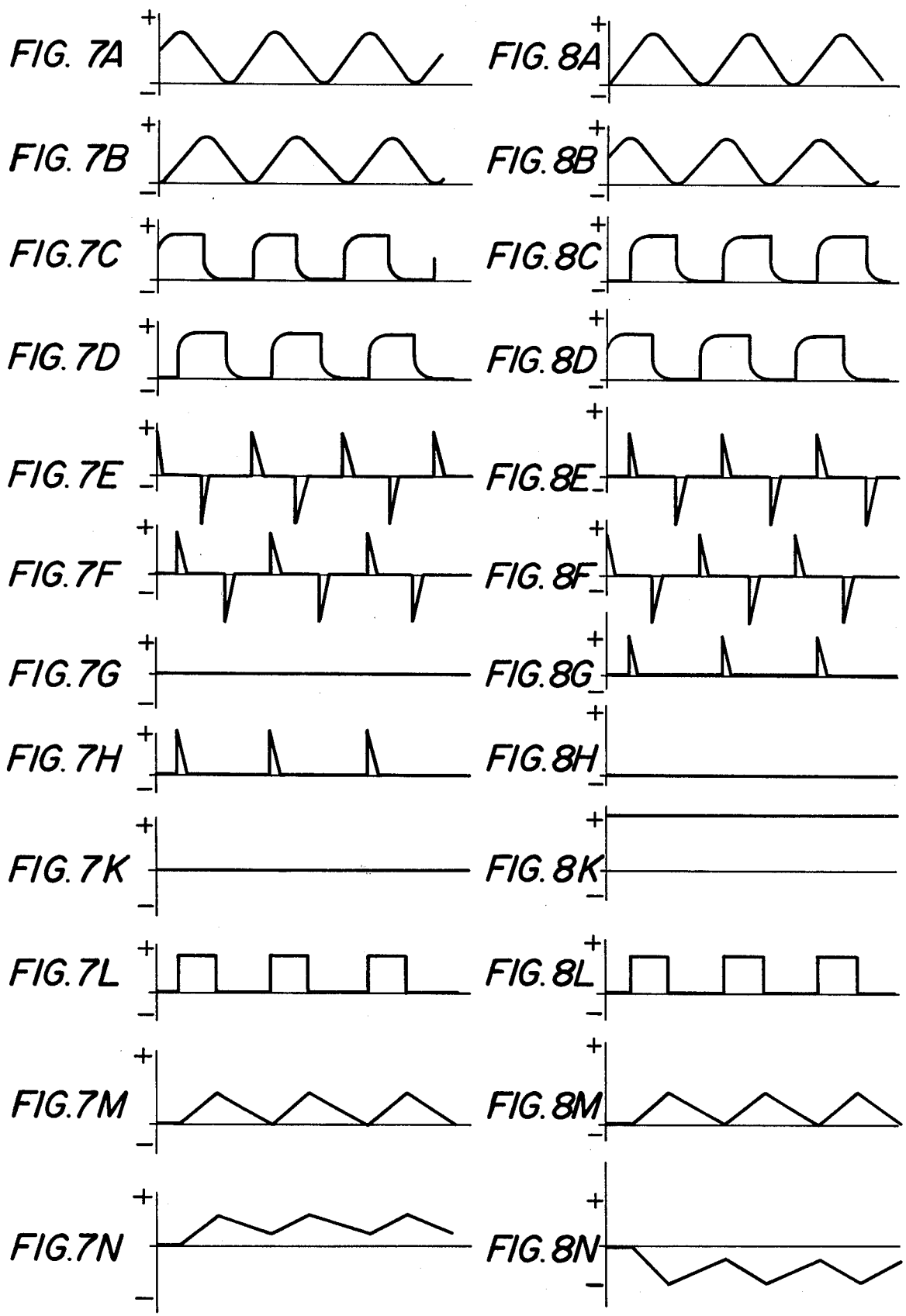

DEVICE FOR MANUALLY CONTROLLING MOVEMENT OF PICKUP ARM IN AUTOMATIC RECORD PLAYER

BACKGROUND OF THE INVENTION (a). Field of the Invention

The present invention relates to a device for manually controlling the movement of a pickup arm in an automatic record player. More particularly, the present invention pertains to a device described above, which is used preferably in a linear tracking pickup arm type record player.

(b). Description of the Prior Art

As well known, a linear tracking pickup arm is arranged so that the pickup arm is always kept in the direction of tangency relative to the record groove of the record disk being played, so that there is the advantage that there occurs substantially no lateral tracking angle error during play. Thus, a wide-ranged use of linear tracking pickup arm is desired. In a pickup arm of such type as described, the pickup arm is moved linearly parallelly, and therefore it is difficult to arrange so that the pickup arm is moved while being held directly by fingers of a person. For this reason, it is desirable to separately provide a manipulating unit for remotely operating the pickup arm to move to a desired position above the record disk placed on the platter. In such an instance, it is preferred to arrange so that the pickup arm may be moved arbitrarily in any linear backward or forward direction, i.e. toward the center of the turntable or outwardly of this center, from the viewpoint of selection of a desired portion of the record groove. In some known automatic record players, however, arrangement is provided so that the pickup arm is manually caused to move only in one direction, and in some other record players, arrangement is provided so that the pickup arm may be manually moved in both backward and forward directions. In these latter players, however, there are provided two manual operating units which, in turn, contribute to a lowering of easy operability of the pickup arm. Also, in still other known automatic record players, there is provided a manual controlling device for moving the pickup arm by the use of a variable resistor. In the pickup arm device of this latter type, however, there is the problem that the life of the potentiometer is relatively short. In addition, the potentiometer has to be returned to its initial inoperative condition whenever the pickup arm has completed, by manual operation, its movement for a desired distance.

SUMMARY OF THE INVENTION

It is, therefore, a primary object of the present invention to provide an improved device for manually controlling the movement of a pickup arm in an automatic record player, which requires only a simple manipulation of a single operating member provided on the device.

Another object of the present invention is to provide a device of the type described above, which is easy in operability and controllability of performance.

A further object of the present invention is to provide a device of the type described above, which is stable and reliable in operation and has a greatly extended service life.

Thus, a typical example of the device for manually controlling the movement of a pickup arm of the linear tracking type according to the present invention comprises:

a manually rotatable manipulation means;

rotating movement trasmitting means for transmitting a rotating movement of said manipulation means;

movement-detecting optical means for photoelectrically detecting the direction and the amount of the rotating movement of said manipulation means transmitted by said rotating movement transmitting means and thereby generating detection signals responsive to the direction and the amount of the movement detected;

circuit means for receiving said detection signals and thereby generating a driving signal associated with the received detection signals with respect to the direction and amount of the rotating movement of the manipulation means; and driving means actuated by said driving signal to move said pickup arm in a direction and for a distance in accordance with this driving signal.

According to one preferred embodiment of the present invention, said manipulation means comprises a disk-shaped plate member secured at its center to a rotatable shaft which is rotatable about its axis; said rotating movement transmitting means is comprised of belt-pulley assembly, and transmits a rotation of the shaft to another rotatable shaft; said movement detecting optical means comprises a disk-shaped round plate secured to this another shaft and provided with a plurality of uniformly spaced slits formed along the circular periphery of this round plate; spaced two light-emitting elements arranged on one side of this plate; and two photo-transistors for receiving the light incident thereto through said slits and arranged on the other side of the plate at an interval different from the interval between the slits and also from a distance which is obtained by multiplying the interval by an integer, for generating said detection signals; said circuit means comprises first circuitry for producing a voltage having a level according to the frequency of one of said detection signals, second circuitry for determining, on the basis of phase difference between said detection signals, the direction of rotation of said slit-carrying plate and thereby supplying a signal representative of the detected direction of rotation and third circuitry for generating, as said driving signal, a voltage having a polarity specified by said signal received from said second circuitry and a level according to that of said voltage received from said first circuitry; and said driving means includes a motor which is actuated by said driving signal, and a mechanism driven by said motor to drive said pickup arm.

These and other objects, the features and the advantages of the present invention will become apparent by reference to the following description when taken in conjunction with the accompanying drawings.

BRIEF DESCRIPTION OF THE DRAWINGS

FIGS. 7A to 7N are time charts at respective points A to N in the control circuit means in FIG. 5 when the manipulation unit is rotated clockwise.

FIGS. 8A to 8N are time charts at respective points A to N in the control circuit means in FIG. 5 when the manipulation unit is rotated counter-clockwise.

DETAILED DESCRIPTION OF THE PREFERRED EMBODIMENT

Figure 1:
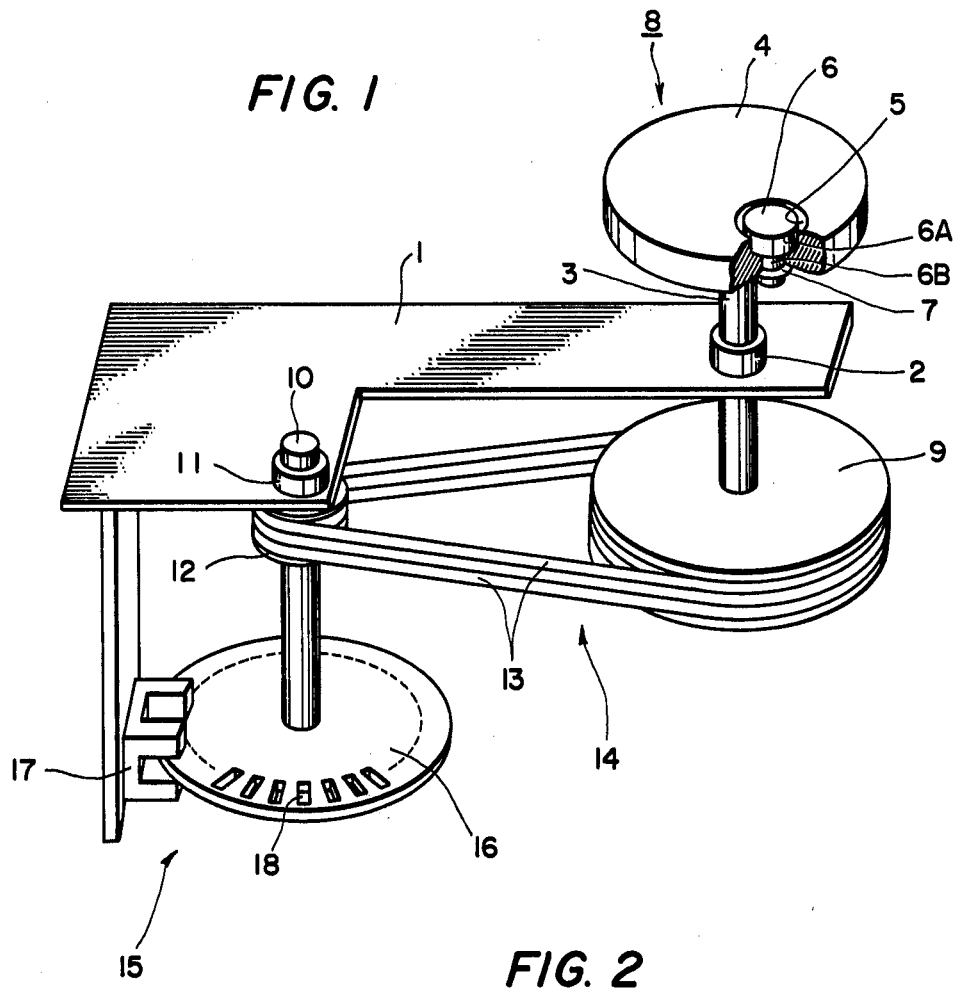
FIG. 1 is a perspective view for illustrating an example of essential part of a device according to the present invention, which includes a manipulation unit, movement transmitting unit and movement detecting unit.

Referring to the drawings, the present invention will be described in detail with respect to an example of the device for manually controlling the movement of a pickup arm in an automatic record player of the linear tracking type. The essential part of the device of the present invention is illustrated in FIG. 1 in perspective view, which includes a manipulation unit generally indicated at 8, a rotating movement transmitting unit generally indicated at 14 and an operation detecting unit generally indicated at 15, all of these operation units being assembled together on a base panel 1. The manipulation unit 8 is adapted to be manually operated for manually controlling the movement of the pickup arm. This operation of the manipulation unit 8 is transmitted through the movement transmitting unit 14 to the operation detecting unit 15.

The manipulation unit 8 comprises a rotatable shaft 3 which is rotatably supported by a bearing means 2 on the base panel 1 and extends substantially vertically through this panel 1 in the drawings. To the upper end of the rotatable shaft 3 is secured an operating member 4 of a disk-like configuration which is adapted to be manually operated by an operator. The operating member 4 preferably has a relatively large mass to develop an appropriately large moment of inertia so as to concurrently function as a fly wheel. In this operating member 4, there is formed a through-hole 5 which is intended for the attachment of a finger piece 6, at a location deviating from the center of rotation of this disk-like operating member 4, i.e. deviating from the position of the axis of the rotatable shaft 3, in such a way that this through-hole 5 is in parallel with the rotation axis of the operating shaft 3. In this through-hole 5 is provided said finger piece 6 so as to be rotatable about an axis which is parallel with the rotation axis of the rotatable shaft 3. The finger piece 6 is formed with a head portion 6A of a disk-like shape and also with a shaft 6B extending from the bottom of this head portion 6A. The through-hole 5 for receiving the finger piece 6 is designed so that its substantially upper half portion has an inner diameter enough for accomodating the head portion 6A of the finger piece 6, leaving a very small clearance therebetween, and that the remaining lower half portion of the through-hole 5 has a reduced inner diameter so as to prevent the passage of the head portion 6A through the hole 5 and to permit the easy rotating movement therein of the shaft portion 6B. The finger piece 6 is received in the hole 5 as illustrated in FIG. 1, with its top 6A surface being exposed in the upper surface of the operating member 4 for being contacted by a finger of the operator. In this state, the finger piece 6 is free to rotate, relative to the operating member 4, about its center axis which is substantially parallel with the axis of the shaft 3. However, the finger piece 6 is prevented from vertically shifting in the through-hole 5 by an intermediate shoulder of the wall of the hole 5, which shoulder engaging the bottom of the larger-diameter top 6A of the finger piece 6 and also by a stopper ring 7, usually called an E-ring, which is fitted to the shaft 6B at a site below the bottom of the operating member 4. As such, when it is intended to move the pickup arm to a required position, the operator of the device can operate the member 4 to rotate it in either clockwise or counterclockwise as the case may be by placing the tip of one of his fingers onto the surface of the disk-like head portion of the finger piece 6 and, making use of friction engagement with this surface, he turns the operating member 4 freely.

The rotating movement transmitting unit 14 which, in fact, is a speed-changing means, comprises a larger-diameter pulley 9 attached to the lower end of the rotatable shaft 3, and a smaller-diameter pulley 12 mounted on a shaft 10 which, in turn, is supported for rotation by a bearing 11 provided on the base panel 1. Between these two pulleys 9 and 12, there is applied an endless belt 13 for intercoupling. This belt 13 may be formed with a material such as rubber material. The rotating movement transmitting unit 14 acts to transmit the rotating movement of the operating member 4, i.e. the rotation of the rotatable shaft 3, to the output-side pulley shaft 10 while increasing the rotation speed by the larger pulley 9 and the smaller pulley 12 via the belt 13.

Figure 2:
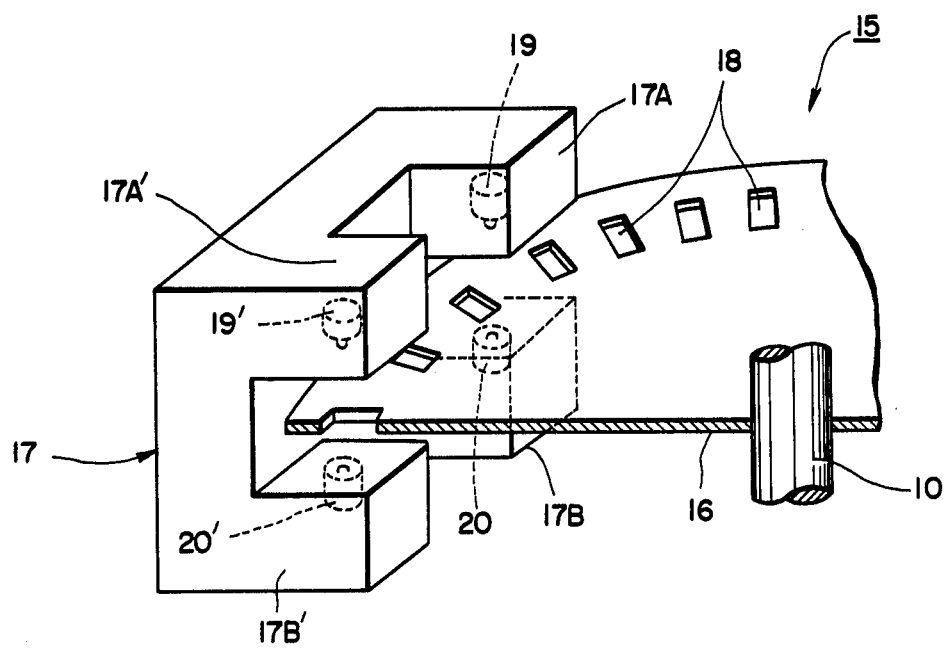
FIG. 2 is a partially cut-away, enlarged perspective view showing an arrangement of the rotating movement detecting unit shown in FIG. 1.
Figure 3:
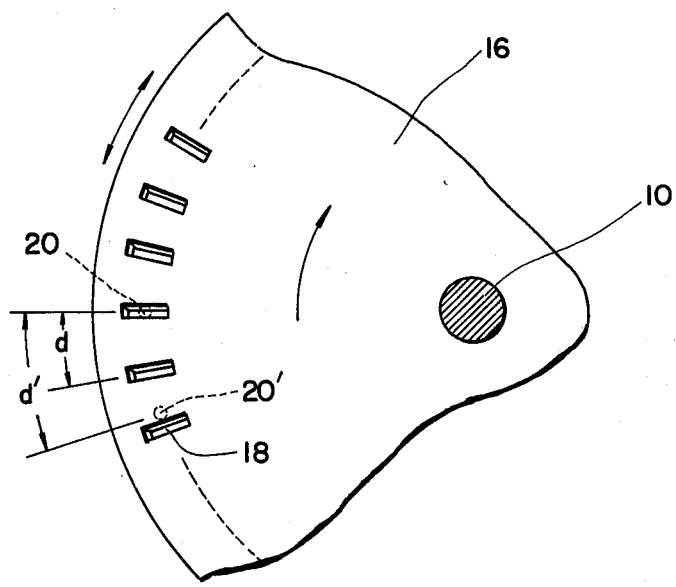
FIG. 3 is an enlarged, partial plan view of a slit-carrying disk-like round plate employed in the rotating movement detecting unit shown in FIGS. 1 and 2.

The operation detecting unit 15 is provided for detecting both the amount and the direction of rotation exerted by the manipulation unit 8, which rotation has been transmitted through the rotating movement transmitting unit 14. The operation detecting unit 15 comprises a slit-carrying disk-like plate 16 provided with a plurality of uniformly spaced slits 18 formed therethrough and secured to the pulley shaft 10, and a photoelectrical detector 17 operative in association with the slit-carrying plate 16 as will be described later in further detail. The arrangement of this slit-carrying plate 16 and the photo-electrical detector 17 are more clearly shown in FIGS. 2 and 3. As illustrated there, the slit-carrying plate 16 is provided with a plurality of narrow slits generally indicated by 18 which are arranged at uniform intervals d radially along the circular periphery of the slit-carrying disk-like plate 16. The photo-electrical detector 17 in this example is comprised of a pair of light-emitting portions 17A and 17A' containing therein a pair of light-emitting elements 19 and 19', respectively, and a pair of light-receiving portions 17B and 17B' containing a pair of light-receiving elements 20 and 20', respectively. The light-emitting portions 17A and 17A' are arranged so that they face the upper side of the slit-carrying disk-like plate 16, and the light-receiving portions 17B and 17B' are arranged so that they face the corresponding light-emitting portions 17A and 17A' via the disk-like plate 16 which intervenes therebetween, as shown in FIG. 2. The light-emitting elements 19 and 19' are provided for illuminating discrete areas of the upper surface of the plate 16, while the light-receiving elements 20 and 20' are intended for receiving the light emitting from the respective light-emitting elements 19 and 19' after passing through those slits 18 which are positioned just above the respective light-receiving elements 20 and 20'. Thus, the light-receiving elements 20 and 20' are adapted to deliver electrical outputs which are indicative of the intensities of the beams of light incident thereonto, respectively. One 20 of the paired light-receiving elements 20 and 20' and the other one 20' thereof in the respective light-receiving portions 17B and 17B' are arranged in such positional relationship as shown in FIG. 3. That is, they are spaced form each other at distance d' which will be described below. Let us now assume that the distance between the respective centers of any adjacent slits 18 and 18 is d and that the distance between the respective centers of the two light-emitting elements 20 and 20' is designated as d'. This distance d' is set so that there is established the relationship:

$$d' = (2n+1)/4 \cdot d \text{ (wherein: } n=1,2,3,\ldots\text{)}.$$

Accordingly, in case, for example, the slit-carrying disk-like plate 16 is turned clockwise in FIG. 3, the beam of light from the light-emitting element 19 will pass through a certain slit and impinges onto one 20 of the light-receiving elements, and thereafter when the plate 16 is further turned clockwise for a distance which is ¼ of the distance d, the beam of light from the other light-emitting element 19' passes through a certain other slit and impinges onto the other one 20' of the light-receiving elements. In the example illustrated, n is selected as being n=3, so that d' is set as being d'=(7/4)d. Accordingly, during the rotation of the slit-carrying plate 16, there will be electrically produced, in the outputs of the light-receiving elements 20 and 20', a phase difference of $\pi/2$ radian. It should be understood that the direction of this phase difference of $\pi/2$ will vary depending on the direction of turn of the slit-carrying plate 16. It should be noted also that in the instant embodiment, photo-transistors are employed to serve as the light-receiving elements 20 and 20', and light-emitting diodes to serve as the light-emitting elements 19 and 19'. It should be noted further that these two light-emitting elements 19 and 19' may be replaced by a single common equivalent so as to emit a beam of light onto a certain area of the slit-carrying plate 16 covering the respective light-receiving portions 17B and 17B'.

Figure 4:
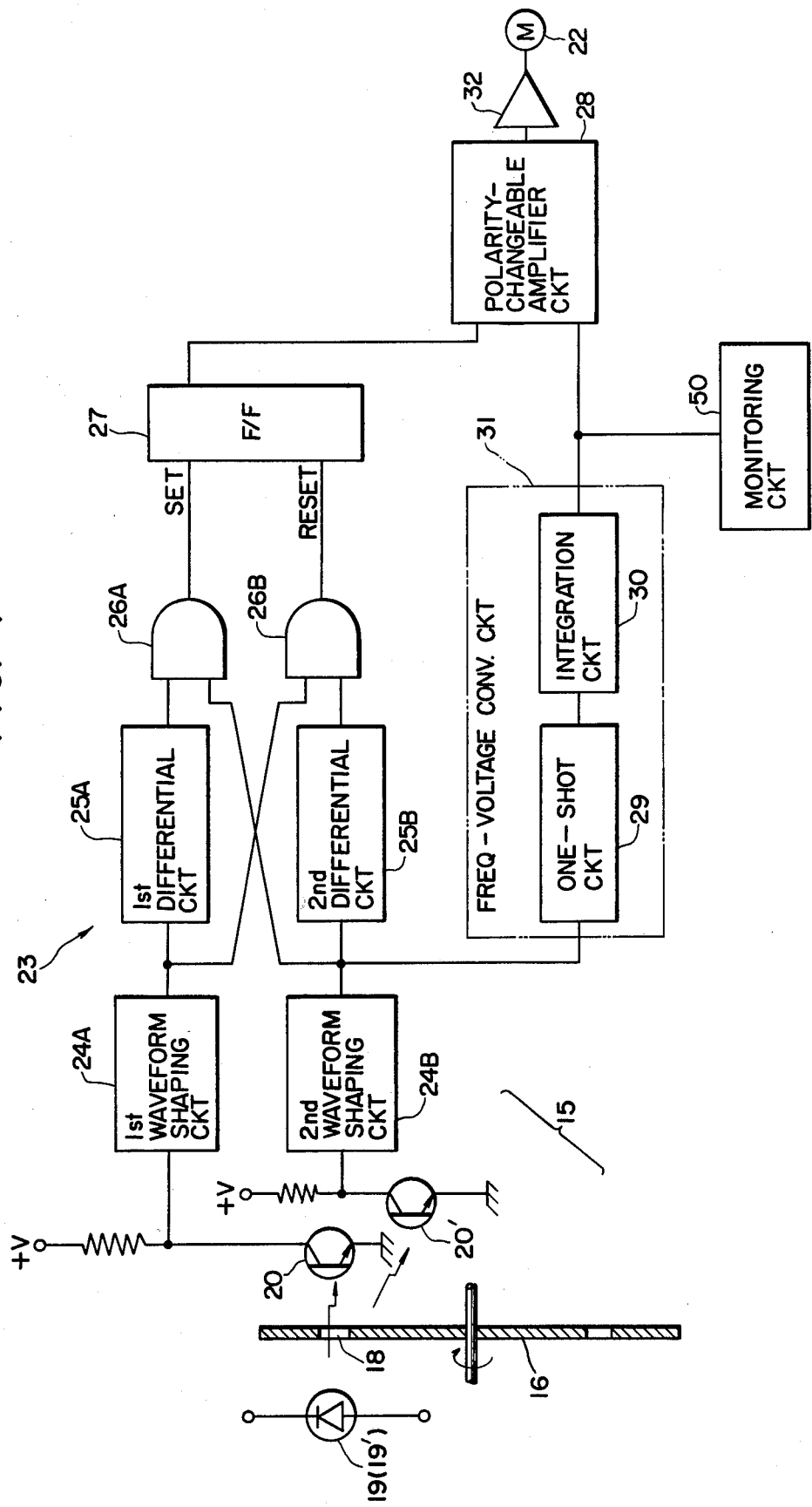
FIG. 4 is a schematical block diagram for showing an example of control circuit means connected to the rotating movement detecting unit in the device of the present invention shown in FIGS. 1 and 2.

The device of the present invention further includes electrical circuit means for controlling a driving unit for the pickup arm in correspondence with the direction and amount of movement of the manipulation unit 8, i.e. the direction and amount of rotation of the slit-carrying plate 16 shown in FIG. 1, by the output signals delivered form the operation detecting unit 15. An arrangement of such control circuit, in principle, is shown in block form in FIG. 4, and is indicated generally at 23. In the electrical circuit means 23, first and second waveform shaping circuits 24A and 24B, which may be respectively a Schmidt-trigger circuit, are provided for substantially squaring pulse signals appearing at the collectors of the photo-transistors 20 and 20', respectively. The rectangular wave signals, i.e. the resulting squared pulse signals, which are delivered from the circuits 24A and 24B are inputted to first and second differential circuits 25A and 25B for being subjected to differentiation. The output of the first differential circuit 25A and the output of the second waveform shaping circuit 24B are delivered to an AND logic circuit 26A whose output is fed to set a flip-flop circuit 27. The outputs of the second differential circuit 25B and the first waveform shaping circuit 24A are applied to another AND logic circuit 26B, the output of which being delivered to re-set the flip-flop circuit 27. This flip-flop circuit 27 is provided for indicating the direction of the rotating movement exerted by the operating member 4. That is, the flip-flop circuit 27 is designed to deliver, as its output signal, a signal of direction of rotating movement. In addition, the output signal of the second waveform shaping circuit 24B is supplied to a frequency-to-voltage converting circuit 31 which produces a voltage having a magnitude corresponding to the frequency of the input signal at the time of arrival of the input signal. This converting circuit 31 in the instant example comprises a one-shot circuit 29 which is triggered by an input pulse signal, and delivers a pulse having a certain constant width, and an integrating circuit 30 supplied with the output pulse signal of the preceding circuit 29. As will be explained later, the magnitude of the output voltage of the converting circuit 31 is related to the velocity of the rotating movement of the operating member 4. The circuit 31 is followed by a polarity-changeable amplifier circuit 28. This amplifier circuit 28 is designed to amplify the output voltage supplied from the converting circuit 30 with a certain polarity according to the direction-of-movement signal delivered by the flip-flop circuit 27. The resulting amplified output signal is fed to a power amplifier circuit 32 driving a motor 22 in the pickup arm driving mechanism. There is further provided a monitoring circuit 50 responsive to the output signal of the converting circuit 31 for displaying on, for example, an indicating lamp, the fact that the manually controlled operation is being performed by the operating member 4.

Figure 5:
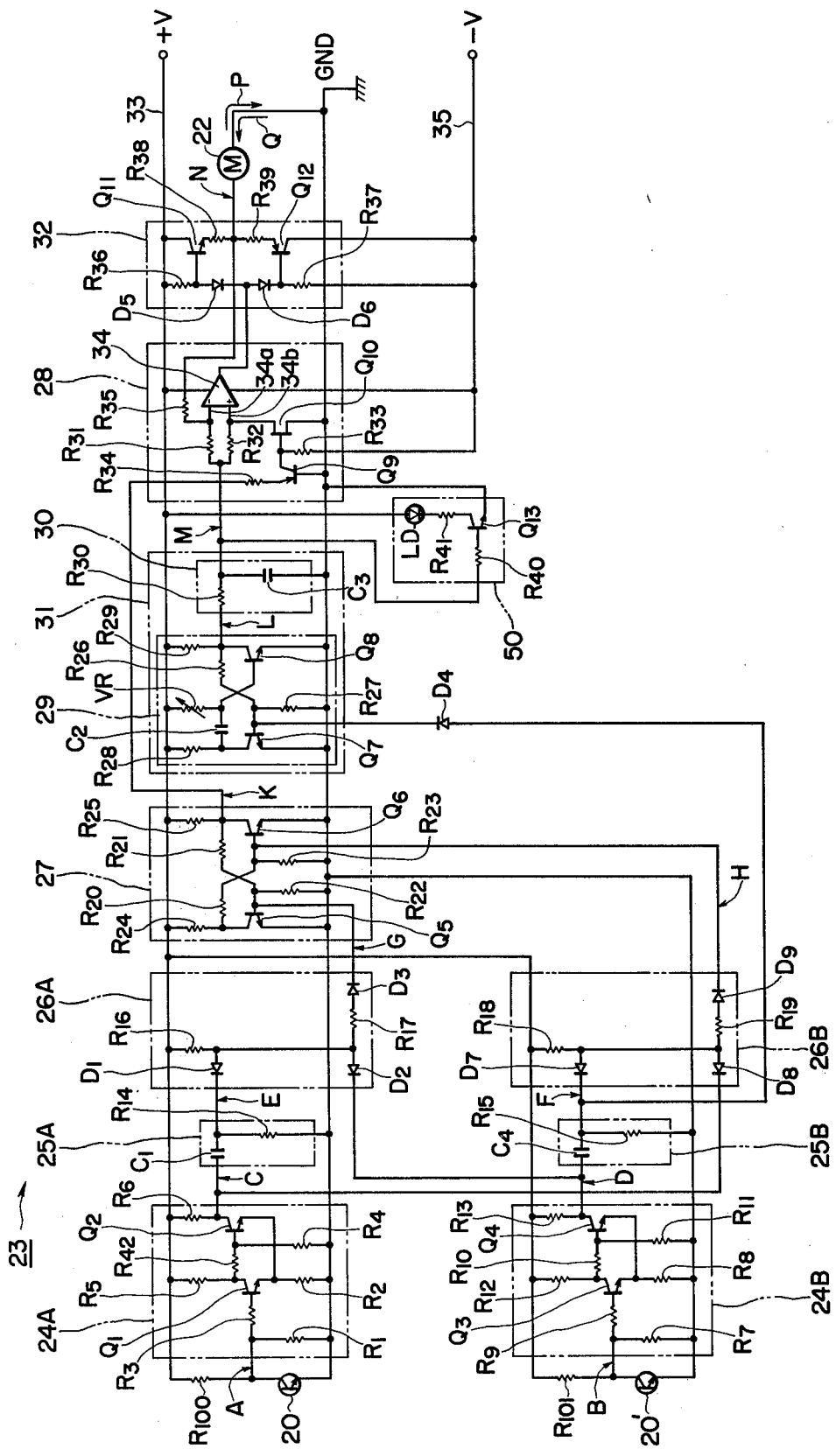
FIG. 5 is a circuit diagram for showing an example of concrete arrangement of the control circuit means shown in FIG. 4.

A more concrete example of arrangement of the above-mentioned electrical circuit means 23 is shown in FIG. 5. In this Figure, the first waveform shaping circuit 24A is constructed with a conventional Schmidt-trigger circuit including bipolar transistors $Q_1$ and $Q_2$ of npn type, and resistors $R_1$ to $R_6$ and $R_{42}$. The transistor $Q_1$ has a collector connected through the resistor $R_5$ to a positive voltage line 33, an emitter grounded via the resistor $R_2$, and a base grounded via a series connection of resistors $R_1$ and $R_3$. The interconnecting point of the resistors $R_1$ and $R_3$ is connected to the collector of the photo-transistor 20 and also to the positive voltage line 33 through a resistor $R_{100}$. The emitter of the photo-transistor 20 is grounded. The transistor $Q_2$ has an emitter coupled to the emitter of the transistor $Q_1$, a collector connected to the positive voltage line 33 through a resistor $R_6$, and a base coupled to the collector of the transistor $Q_1$ via the resistor $R_{42}$ and also grounded via the resistor $R_4$. The second waveform shaping circuit 24B is composed of another conventional Schmidt-trigger circuit including bipolar transistors $Q_3$ and $Q_4$ and resistors $R_7$ to $R_{13}$, the connections of which being similar to those of the first waveform shaping circuit 24A. With respect to the photo-transistor 20', it is connected at its collector to the positive voltage line 33 through a resistor $R_{101}$, and the emitter thereof is grounded.

The output terminal of the first waveform shaping circuit 24A, i.e. the collector of the transistor $Q_2$, is coupled to a capacitor $C_1$ which constitutes the first differential circuit 25A jointly with a resistor $R_{14}$, and further to a diode $D_8$ included in the second AND logic circuit 26B. The output terminal of the second waveform shaping circuit 24B, i.e. the collector of the transistor $Q_4$, is connected to the second differential circuit 25B which includes a capacitor $C_4$ and a resistor $R_{15}$, and also to a diode $D_2$ included in the first AND logic circuit 26A. The AND logic circuit 26A includes, in addition to the diode $D_2$, diodes $D_1$ and $D_3$ and resistors $R_{16}$ and $R_{17}$. The cathode of the diode $D_1$ is coupled to the inter-junction point of the elements $C_1$ and $R_{14}$, and the anode thereof is connected, together with the anode of the diode $D_2$, to the positive voltage line 33 via the resistor $R_{16}$ and to the anode of a diode $D_3$ via the resistor $R_{17}$. The second AND logic circuit 26B is similar in arrangement to the first AND logic circuit 26A, and includes diodes $D_7$ to $D_9$ and resistors $R_{18}$ and $R_{19}$.

The flip-flop circuit 27 is of a conventional type which comprises npn-type bipolar transistors $Q_5$ and $Q_6$ cross-coupled with resistors $R_{20}$ and $R_{21}$. The collectors of these transistors $Q_5$ and $Q_6$ are connected to the positive voltage line 33 via resistors $R_{24}$ and $R_{25}$, respectively. The bases of these transistors are grounded via resistors $R_{22}$ and $R_{23}$, respectively. With a positive pulse supplied to the base of the transistor $Q_5$, which is the set input terminal, the flip-flop circuit 27 is triggered to be rendered to the set state. On the other hand, a positive pulse supplied to the base of the transistor $Q_6$ can trigger the flip-flop circuit 27 into the re-set state. Such triggering pulses for the flip-flop circuit 27 are supplied from the blocking diodes $D_3$ and $D_9$ of the AND logic circuits 26A and 26B, respectively.

The frequency-to-voltage converting circuit 31 is composed with bipolar transistors $Q_7$ and $Q_8$ of npn type for forming the one-shot circuit 29 of an ordinary one-shot circuit configuration, and the combination of a resistor $R_{30}$ and a capacitor $C_3$, which constitutes the integration circuit 30. The base of the transistor $Q_7$ is coupled to the collector of the transistor $Q_8$ through a resistor $R_{26}$ and grounded through a resistor $R_{27}$, and the base of the latter transistor $Q_8$ is connected to the collector of the former transistor $Q_7$ through a capacitor $C_2$ and also to the positive voltage line 33 via a variable resistor VR. Also, the collectors of these two transistors $Q_7$ and $Q_8$ are connected to the positive voltage line 33 through resistors $R_{28}$ and $R_{29}$, with the emitters being grounded. The one-shot circuit 29 is adapted to be triggered by a positive pulse delivered through a blocking diode $D_4$ from the second differential circuit 25B. When the one-shot circuit 29 is triggered, it delivers, onto the collector of the transistor $Q_8$, a single positive rectangular pulse having a pulse width specified by the time-constant value of a network which is comprised of the capacitor $C_2$ and variable resistor VR. The output pulse from this one-shot circuit 29 is fed to the CR integration network 30.

With respect to the polarity changeable amplifier circuit 28, it comprises an operational amplifier 34 powered by the positive and negative voltage supplying lines 33 and 35, a pnp-type bipolar transistor $Q_9$ and an N-channel field effect transistor $Q_{10}$. The inverting and non-inverting input terminals of the operational amplifier 34 are coupled to the output of the integration circuit 30, and the non-inverting input terminal is grounded via the field effect transistor $Q_{10}$. The gate of the transistor $Q_{10}$ is connected to the collector of the transistor $Q_9$ and to the negative voltage supplying line 35 via a resistor $R_{33}$. The emitter of the transistor $Q_9$ is coupled through a resistor $R_{34}$ to the collector of the transistor $Q_6$ of the flip-flop circuit 27. The inverting input terminal of the operational amplifier 34 is subjected to feedback of the output signal of the power amplifier 32 through a resistor $R_{35}$. Usually, the resistors $R_{31}$, $R_{32}$ and $R_{35}$ all have a same resistance.

The power amplifier circuit 32 is a complementary push-pull amplifier circuit which comprises an npn-type bipolar power transistor $Q_{11}$ and a pnp-type bipolar power transistor $Q_{12}$. The collectors of the transistors $Q_{11}$ and $Q_{12}$ are connected to the voltage supplying lines 33 and 35, respectively, and their emitters are connected, through resistors $R_{38}$ and $R_{39}$ having a small resistance, to the output terminal of the amplifier 32. The bases of the transistors $Q_{11}$ and $Q_{12}$ are appropriately biased with a base biasing network which is composed of a series connection of a diode $D_5$ and resistor $R_{36}$ inserted between the line 33 and the output terminal of the operational amplifier 34, and further composed of another series connection of a diode $D_6$ and resistor $R_{37}$ inserted between the operational amplifier output terminal and the line 35. The motor 22 employed in the pickup arm driving mechanism is connected between the output terminal of the power amplifier circuit 32 and the ground line.

The monitoring circuit 50 comprises an npn-type bipolar transistor $Q_{13}$ having its base connected, via a resistor $R_{40}$, to the end of the resistor $R_{30}$ which, in turn, is connected to the capacitor $C_3$ of the integration circuit 30, and a light-emitting diode LD which is inserted in series with a resistor $R_{41}$ between the positive line 33 and the collector of the transistor $Q_{13}$. The emitter of the transistor $Q_{13}$ is grounded.

Figure 6:
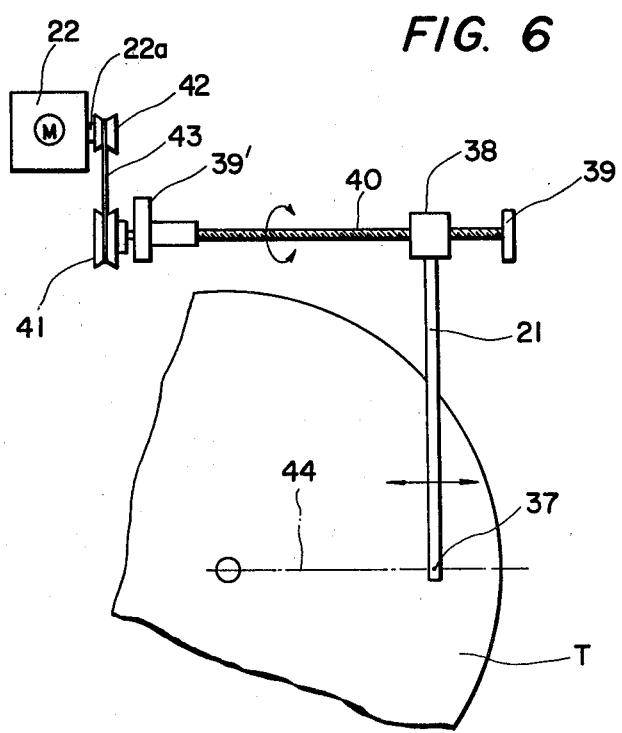
FIG. 6 is a diagrammatic plan view for schematically showing an example of pickup driving means to drive a pickup arm in a linear tracking pickup apparatus upon receipt of an output signal from said control circuit means shown in FIGS. 4 and 5.

An example of the aforesaid pickup arm driving mechanism of a linear-tracking-type pickup arm device is schematically shown in FIG. 6. This example of driving mechanism comprises a driving rod 40 which is circumferentially threaded with a small pitch. A straight pickup arm 21 is supported, at its base, on an arm-supporting member 38 which is in thread engagement with the driving rod 40, and extends so as to be movable, on a guide rail not shown, laterally linearly and in a radial direction of a turntable T above this turntable T on which a record disk is to be placed. At the foremost end of the pickup arm, a stylus 37 is provided. The driving rod 40 is rotatably supported at its opposite ends by bearing means 39 and 39' so as to be rendered parallel with the direction of a radius indicated by a dashed line 44 of the turntable T. To one end of this driving rod 40 is attached a pulley 41 having a relatively large diameter, which is coupled, via an endless belt 43, to a smaller-diameter pulley 42 which is mounted on a rotatable shaft 22a of the pickup arm driving motor 22. By this arrangement, the rotation of the motor 22 is transmitted, after being reduced in speed, to the threaded driving rod 40. When this motor 22 is driven by the application of a current flowing in a certain direction to cause the driving rod 40 to rotate in a certain direction at a reduced speed of rotation, the arm-supporting member 38 carrying the pickup 21 is fed linearly in a certain direction and in parallel with the direction of a radius indicated by the dashed line 44 of the platter T along the driving rod. Thus, the pickup arm 21 is laterally progressively displaced radially of the turntable T, with the stylus 37 following a linear trace indicated by the dashed line 44 which intersects the center spindle of the turntable T.

Additionally speaking, during an ordinary playback of a record disk, the motor 22 may be driven by an automatic driving means (not shown) in accordance with the turning of the turntable T. This automatic driving means, generally, includes an offset detecting means for detecting an offset angle produced by the pickup arm 21 due to the tracing of the record groove by the stylus 37, relative to the direction perpendicular to the dashed line 44, and also includes a motor driving means responsive to the detected offset angle for driving the motor 22 to rotate in such a manner that the offset angle will be reduced within a rated limit. Further, the pickup arm device is equipped with arm lifter means (not shown) which is intended to be used for lifting the pickup arm 21 off a record disk which is placed on the turntable T. During the manually operated mode by relying on the system according to the present invention, however, the pickup arm 21 is lifted by said lifter means, and the pickup arm 21 is forced to make a linear movement in the state of this pickup arm being separated from contact, at its stylus, with the record groove of the record disk. Therefore, this manual operation is irrelevant of said detection of off-set angle, as will be needless to say.

Referring now to the time chart of FIGS. 7A to 7N and FIGS. 8A to 8N, description will be made on the operation of the example of the device of the present invention. Let us assume that the operating member 4 in the manipulation unit 8 is caused to turn clockwise in FIGS. 1, 2 and 3. In such case, the slit-carrying plate 16 is rotated clockwise at a speed increased by the speed-changing mechanism stated previously. Whereupon, the beams of light emitting from the light-emitting portion 17A and 17A' after having passed through respective slits 18, impinge intermittently one after another onto the light-receiving portions 17B and 17B'. The photo-transistors 20 and 20' deliver, at their collectors A and B (see FIG. 5), pulsating signals as shown in FIGS. 7A and 7B, respectively. In other words, the intensity of the beam of light incident onto each of the photo-transistors 20 and 20' through slits 18 on the slit-carrying plate 16 is changed in such fashion as plotted in FIGS. 7A and 7B, respectively, as the slit-carrying plate 16 rotates clockwise progressively at a rotation speed proportional to that of the operating member 4. The signal at point A leads the signal at point B by a phase angle corresponding to a quarter of one cycle, because the photo-transistors 20 and 20' are arranged at a interval $d' = 7d/4$ (generally $d' = (2n+1)d/4$) and because the slit-carrying plate 16 is rotated in the clockwise direction. Needless to say, the repetition frequency of the signals appearing at points A and B is proportional to the rotation speed of the slit-carrying plate 16 or that of the operating member 4. The respective signals delivered at points A and B are substantially squared through the first and second waveform shaping circuits 24A and 24B and as a result, there are outputted, at the collectors C and D of the transistors $Q_2$ and $Q_4$, substantially rectangular pulses as shown in FIGS. 7C and 7D, respectively. Upon receipt of these rectangular-like pulses delivered at point C, the first differential circuit 25A supplies spike pulses as shown in FIG. 7E at the output point E thereof. Also, the second differential circuit 25B delivers spike pulses as shown in FIG. 7F at the output point F thereof in response to the rectangular-like pulses derived at point D. The output signals (FIGS. 7E and 7D) of the circuits 25A and 24B are fed to the first AND logic circuit 26A, and the output signals (FIGS. 7F and 7C) of the circuits 25B and 24A are supplied to the second AND logic circuit 26B. As can be seen in FIGS. 7D and 7E, there arises no such instance that both signals shown in FIGS. 7D and 7E assume a positive level at the same time, and therefore the potential of the output point G of the AND logic circuit 26A remains low as shown in FIG. 7G. Whereas, the second AND logic circuit 26B supplies, to its output point H, positive spike pulses as shown in FIG. 7H whenever both signals shown in FIGS. 7C and 7F assume a positive potential. The spike pulses shown in FIG. 7H thus delivered are substantially in phase with positive pulses of the input spike pulses shown in FIG. 7F. With the positive pulse of FIG. 7H supplied to the gate of the transistor $Q_6$, the flip-flop circuit 27 is re-set and the potential at the output point K thereof is maintained low as shown in FIG. 7K. Regarding the frequency-to-voltage converting circuit 31, its one-shot circuit 29 generates, at the output point L, a positive rectangular pulse having a constant width and magnitude at each arrival of the positive pulse of the spike pulse of FIG. 7F from the second differential circuit 25B. The pulses shown in FIG. 7L thus generated is integrated in the integration circuit 30 at the output point M, at which point there is obtained a positive voltage as shown in FIG. 7M. The repetition frequency of the output signal of FIG. 7L of said one-shot circuit is proportional to that of the trigger signal of FIG. 7F and accordingly it is also proportional to the rotation speed of the operating member 4. On the other hand, the output voltage M of the integration circuit 30 has its average level dependent on the frequency of the signal shown in FIG. 7L. Therefore, the average level of the voltage M will vary in accordance with the speed at which the operating member 4 is rotated. The output voltage M of the frequency-to-voltage converting circuit 31 is inputted to the operation amplifier 34 in the circuit 32. In the instant discussion, the field effect transistor $Q_{10}$ is turned off, because the gate driving transistor $Q_9$ is deenergized due to the low potential at the output point K of the flip-flop circuit 27. Under such condition, the operational amplifier 34 delivers an output signal having a positive polarity and a level corresponding to that of the input signal, i.e. the signal M. Thus, such signal as shown in FIG. 7N is delivered at the output point N of the power amplifier circuit 32, by which singal the motor 22 which is provided in the pickup arm driving mechanism is driven to revolve in a direction corresponding to the direction of the current flow indicated by arrow line P and at a rotation speed associated with the level of the signal shown in FIG. 7N. Accordingly, the pickup arm 21 is moved at a speed in accordance with the rotation speed of the operating member 4 and in a direction corresponding to the direction of rotation of the operating member 4. Since the cease of rotation of the operating member 4 is followed by vanishment of signal shown in FIG. 7F, the driving of the pickup arm 21 will cease almost immediately after the manual turning of the operating member 4 is stopped. During the manually-controlled driving of the pickup arm 21, the transistor $Q_{13}$ in the monitoring circuit 50 is kept conductive as the positive voltage is delivered at the point M. Therefore, the light-emitting diode LD continues to illuminate, indicating that the pickup arm 21 is being controlled in manual mode.

Next, with reference to FIGS. 8A through 8N, description will be made with respect to the operation of the device of the present invention when the operating member 4 is manually rotated in the counter-clockwise direction in FIGS. 1, 2 and 3. In this case, the signals of FIGS. 8A and 8C lag behind the signals of FIGS. 8B and 8D by a phase angle corresponding to a quarter of one cycle period of these latter signals, as shown in FIGS. 8A, 8B, 8C and 8D. Hence, the signals shown in FIGS. 8E and 8F are produced in such timing correlation as shown in these Figures. Therefore, the first AND logic circuit 26A delivers such spike pulse signal as shown in FIG. 8G at its output point G, while the potential at the output point H of the second AND logic circuit 26B is held at a low level as shown in FIG. 8H. With the signal G supplied to the base of the transistor $Q_5$, the flip-flop circuit 27 is rendered to the set state, and along therewith the potential at point H is held high (positive) as shown in FIG. 8K. The positive potential at point K renders the transistor conductive, which, in turn, renders the field effect transistor $Q_{10}$ on. In this case wherein the non-inverting input terminal of the operational amplifier 34 is grounded through the conductive transistor $Q_{10}$, the operational amplifier 34 acts as an inverting amplifier. Thus, the operational amplifier 34 generates an output signal which is such that its magnitude is proportional to that of the input signal but that its polarity is inverted. As a result, there is delivered at point N a negative signal as shown in FIG. 8N, which causes a current to flow through the motor 22 in a direction indicated by arrow line Q. Whereupon, the pickup arm 21 is driven in the opposite direction relative to the direction noted in the previously described instance of operation.

It should be noted here that, during the manually-controlled driving of the pickup arm 21 performed by the device of the present invention, the pickup arm 21 is in the state of being uplifted above the turntable T by the arm lifter means not shown which is provided in the record player.

It should be understood that in this example stated above, an adjustment of the resistance of the variable resistor VR in the one-shot circuit 29 can change the ratio between the speed at which the operating member 4 is rotated and the corresponding speed at which the pickup arm 21 is driven. The operating member 4 may be modified so that, in place of being turned, it is linearly moved manually. Similarly, the slit-carrying disc-like plate 16 may be shaped to be a straight rectangular plate and arranged to be linearly movable between the light-emitting elements 19 and 19' and the light-receiving elements 20 and 20' in accordance with the movement of the operating member 4. Moreover, the control circuit means 23 may be designed, if required, so that it drives the arm driving mechanism to drive the pickup arm 21, at a given speed and independently of the rotation speed of the operating member 4, for a distance in accordance with the distance covered by the operating member 4. This modification of the control circuit means 23, however, might degrade the operability of the device of the present invention to some extent. Namely, in the event that the pickup arm is located substantially apart from an aimed position, it is generally desirable to be able to move the pickup arm 21 quickly toward the aimed position. On the other hand, when the pickup arm 21 is located near the aimed position, it is convenient to be able to move the pickup arm 21 at a low speed. Thus, it would usually be preferable to arrange the control circuit menas 23 in a manner as described previously in which the pickup arm 21 is moved at a speed according to the speed of movement of the operating member 4.

Description has been made of an instance wherein the present invention is applied to an automatic record player of the linear tracking pickup arm type. Though not stated expressly, however, it should be understood by those skilled in the art that the present invention may be equally effectively applied also to automatic record players of the so-called pivotal tracking pickup arm type.

As has been stated above, according to the device of the present invention, a pickup arm can be moved for any desried distance in each of the desired directions, i.e. either toward the center of the turntable or toward the outer periphery of the turntable, simply by a manipulation of a single operating unit, and accordingly it is possible to select any desired portion of the record groove of a record disk by a simple operation. In addition, the provision of optical detecting means enables that the detection of the amount and direction of the movement of the operating unit is made without any mechanical contact in the detecting system. Thus, the life of this device is prolonged and stable operation is ensured.

What is claimed is:

1. A device for manually controlling movement of a pickup arm in an automatic record player, comprising:
   manually operative manipulation means selectively movable in opposite directions;
   means for transmitting movement of said manipulation means;
   means for detecting the amount and direction of the movement of said manipulation means transmitted by said movement transmitting means and for generating detection signals representative of the detected movement in both amount and direction;
   circuit means receiving said detection signals and generating a driving signal in response to the detection signals received; and
   means responsive to said driving signal for driving said pickup arm in accordance with this driving signal in a direction and by an amount proportionally to the movement of said manipulation means whereby said pickup arm will move proportionally and follow faithfully all movements of said manipulation means.

2. A device for manually controlling movement of a pickup arm in an automatic record player, comprising:
   manually movable manipulation means;
   movement transmitting means for transmitting a movement of said manipulation means;
   movement detecting means for detecting the amount and direction of the movement of said manipulation means transmitted by said movement transmitting means and thereby generating detection signals responsive to the detected movement in both amount and direction, said detection signals having a frequency corresponding to the speed of the movement detected and having a phase difference representative of the direction of the movement detected;
   circuit means receiving said detection signals and generating a driving signal associated with the detection signals received; and
   driving means responsive to said driving signal for driving said pickup arm in accordance with the driving signal.

3. A device according to claim 2, in which:
   said movement detecting means comprises: a movable slit-carrying member provided with a plurality of slits and moved in accordance with a movement transmitted by said movement transmitting means; at least one light-emitting means for irradiating a beam of light onto one side of said slit-carrying member; and at least two light-receiving means arranged on the other side of said slit-carrying member for receiving the beam of light passing through the slits of said slit-carrying member, and in which: said detection signals are produced by said light-receiving means.

4. A device according to claim 3, in which:
said light-emitting means comprises a light-emitting diode, and said light-receiving means comprises photo-transistors.

5. A device according to claim 3, in which:
said slits are arranged in a row at uniform intervals (d) on said slit-carrying member, and in which:
adjacent light-receiving means are arranged at a distance (d') therebetween to face the row of slits.

6. A device according to claim 5, in which:
said distance (d') between the respective light-receiving means is defined as: $d' = (2n+1)d/4$ wherein n designates an integer including zero.

7. A device according to claim 3, in which:
said slit-carrying member comprises a disk-like member supported to be rotatable about a center thereof, and said slits are arranged along a circular periphery of said slit-carrying member.

8. A device according to claim 7, in which:
said manipulation means comprises an operating member secured to a shaft supported to be rotatable about its center axis, and
said movement transmitting means comprises a pulley secured to said shaft, another pulley secured to another shaft supported to be rotatable about its center axis, and an endless belt applied between said two pulleys, and in which:
said slit-carrying member is secured, at its center, said another shaft of said movement transmitting means.

9. A device according to claim 8, in which:
said operating member is of a disk-like configuration and is secured, at its center, to one end of said shaft, this operating member being equipped with a finger piece rotatably attached to the operating member at a location other than the center of this operating member.

10. A device according to claim 2, in which:
said circuit means comprises: first circuitry responsive to at least one of said detection signals for producing a voltage having a magnitude according to the frequency of said detection signal; second circuitry for generating, on the basis of said detection signals, a signal representing the direction of said detected movement; and third circuitry for delivering, as said driving signal, a voltage having a polarity specified by said signal supplied from said second circuitry and a magnitude according to that of said voltage delivered from said first circuitry, and in which:
said driving means includes an electric motor actuated by said driving signal, and a driving mechanism driven by said motor to drive said pickup arm.

11. A device according to claim 10, in which:
said second circuitry comprises: a first waveform shaping circuit receiving one of said detection signals to produce a corresponding substantially rectangular pulse; a second waveform shaping circuit receiving another one of said detection signals to produce a corresponding substantially rectangular pulse; a first differential circuit for differentiating the output pulse of said first waveform shaping circuit to produce a pulse at a leading edge of the output pulse of said first waveform shaping circuit; a second differential circuit for differentiating the output pulse of said second waveform shaping circuit to produce a pulse at a leading edge of the output pulse of said second waveform shaping circuit; a first AND logic circuit receiving said output pulses of said first differential circuit and said second waveform shaping circuit; a second AND logic circuit receiving said output pulses of said second differential circuit and said first waveform shaping circuit; and a flip-flop circuit which is set by an output of said first AND logic circuit and is re-set by an output of said second AND logic circuit, said signal representative of the direction of said detected movement being delivered from said flip-flop circuit, and in which:
said first circuitry comprises: a one-shot circuit which is triggered by the output pulse of one of said waveform shaping circuits to produce a pulse having a constant level and width at each arrival of the triggering pulse; and an integration circuit for integrating the output of said one-shot circuit to deliver a voltage having a level related to a repetition fequency of said output of said one-shot circuit.

12. A device according to claim 10, further comprising: a circuit actuated by said voltage delivered from said first circuitry for energizing an operation-indicating device.

* * * * *